US009320962B2

(12) United States Patent
Krell

(10) Patent No.: US 9,320,962 B2
(45) Date of Patent: Apr. 26, 2016

(54) APPARATUS AND METHODS FOR QUICKLY RELEASING A HUB-AND-WHEEL ASSEMBLY

(71) Applicant: Brian J. Krell, Denver, CO (US)

(72) Inventor: Brian J. Krell, Denver, CO (US)

( * ) Notice: Subject to any disclaimer, the term of this patent is extended or adjusted under 35 U.S.C. 154(b) by 373 days.

(21) Appl. No.: 13/971,060

(22) Filed: Aug. 20, 2013

(65) Prior Publication Data

US 2014/0054952 A1  Feb. 27, 2014

Related U.S. Application Data

(60) Provisional application No. 61/691,580, filed on Aug. 21, 2012.

(51) Int. Cl.
| | |
|---|---|
| A63C 17/22 | (2006.01) |
| B60B 23/00 | (2006.01) |
| B60B 27/02 | (2006.01) |
| B60B 37/10 | (2006.01) |
| B60B 3/18 | (2006.01) |
| A63C 17/02 | (2006.01) |
| B60B 5/02 | (2006.01) |

(52) U.S. Cl.
CPC .................. *A63C 17/223* (2013.01); *B60B 3/18* (2013.01); *B60B 27/02* (2013.01); *B60B 37/10* (2013.01); *A63C 17/02* (2013.01); *B60B 5/02* (2013.01); *Y10T 29/49535* (2015.01); *Y10T 29/49622* (2015.01); *Y10T 29/49826* (2015.01)

(58) Field of Classification Search
CPC ............ B60B 33/0028; B60B 2200/47; B60B 2320/10; B60B 3/00; B60B 23/00; B60B 23/02; B60B 23/04; B60B 23/06; B60B 23/10; A63C 17/22; A63C 17/223; A63C 17/226

USPC ............ 301/5.301, 5.305, 5.306, 5.309, 10.1, 301/11.1–11.3
See application file for complete search history.

(56) References Cited

U.S. PATENT DOCUMENTS

| | | | | | |
|---|---|---|---|---|---|
| 1,407,787 | A | * | 2/1922 | Darrow | B60B 23/04 301/17 |
| 1,456,375 | A | * | 5/1923 | Forsman | B60B 23/04 301/28 |
| 1,557,862 | A | * | 10/1925 | Morgan | B60B 23/04 301/28 |
| 1,707,458 | A | * | 4/1929 | Clench | B60B 23/04 188/31 |
| 2,289,448 | A | * | 7/1942 | Monroe | B60B 3/18 301/35.61 |
| 2,334,828 | A | * | 11/1943 | Mallory | B60B 7/16 152/386 |
| 3,390,916 | A | * | 7/1968 | Shelton | B60B 3/18 301/35.61 |

(Continued)

*Primary Examiner* — Joseph Rocca
*Assistant Examiner* — Travis Coolman
(74) *Attorney, Agent, or Firm* — James A. Sheridan; Sheridan Law, LLC

(57) ABSTRACT

The disclosure provides apparatus and methods of use and manufacture pertaining to a quick release hub-and-wheel assembly. In one embodiment, the hub-and-wheel assembly includes interior and exterior sleeves disposed about a rotatable locking ring that is biased to a latched position. The assembly also includes a quick release wheel having a latch that is configured to temporarily displace a latch-engagement mechanism on the locking ring from the latched position to an unlatched position such that the latch is captured by the latch-engagement mechanism when the latch-engagement mechanism returns to the biased, latched position. The locking ring also includes a manual latch-release mechanism configured to again temporarily displace the latch-engagement mechanism such that the wheel latch is released, allowing the wheel to be removed. Other embodiments are also disclosed.

19 Claims, 6 Drawing Sheets

(56) References Cited

U.S. PATENT DOCUMENTS

| | | | | |
|---|---|---|---|---|
| 3,790,217 A * | 2/1974 | DeRegnaucourt | B60B 23/04 | 301/12.1 |
| 3,930,683 A * | 1/1976 | MacKeown | B60B 25/00 | 152/412 |
| 4,218,098 A * | 8/1980 | Burton | A63C 17/223 | 152/323 |
| 5,308,152 A * | 5/1994 | Ho | A63C 17/06 | 152/323 |
| 5,408,854 A * | 4/1995 | Chiu | B60B 37/04 | 301/111.02 |
| 5,494,340 A * | 2/1996 | Cheng | B60B 37/10 | 301/111.07 |
| 6,824,158 B1 * | 11/2004 | Keller | A63C 9/005 | 280/617 |
| 6,886,893 B1 * | 5/2005 | Fisch | B60B 5/02 | 301/111.01 |
| 6,932,436 B2 * | 8/2005 | Chae | B60B 3/14 | 157/16 |
| 7,108,335 B2 * | 9/2006 | Morris | B60B 3/001 | 301/111.01 |
| 7,377,597 B2 * | 5/2008 | Morris | B60B 37/10 | 301/111.04 |
| 8,549,705 B1 * | 10/2013 | Wu | A47B 91/06 | 16/31 A |
| 8,590,984 B2 * | 11/2013 | Morris | B65F 1/1473 | 301/111.01 |
| 2002/0070512 A1 * | 6/2002 | Szendel | A63C 17/22 | 280/11.27 |
| 2004/0223675 A1 * | 11/2004 | Adrianus | A63C 17/223 | 384/449 |
| 2012/0074663 A1 * | 3/2012 | Parker | B60B 37/10 | 280/29 |

* cited by examiner

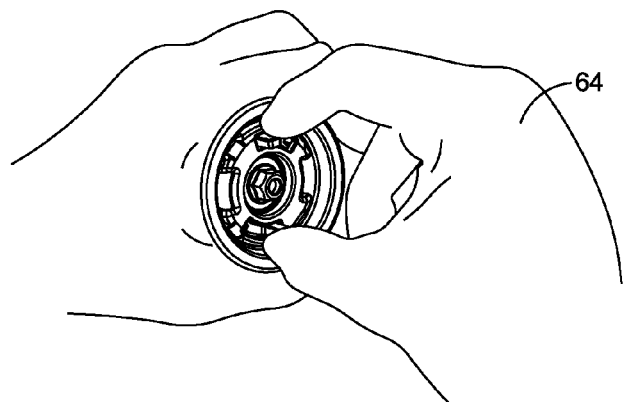
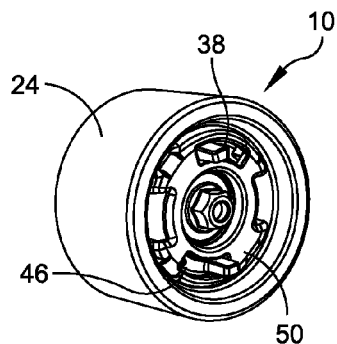
FIG. 5A  FIG. 5B
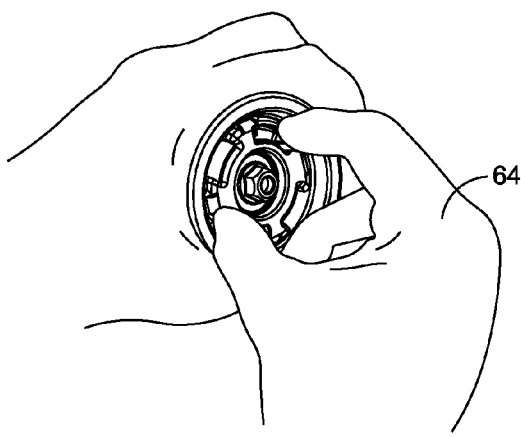
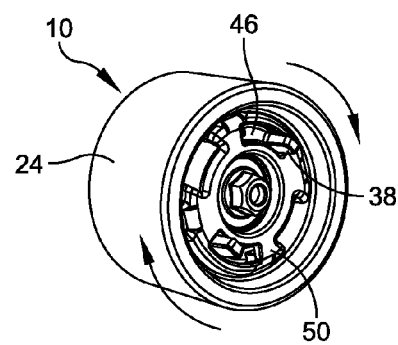
FIG. 5C  FIG. 5D
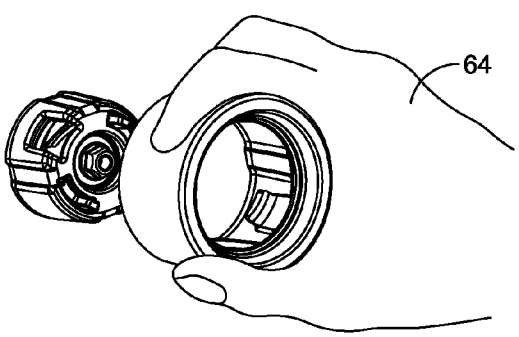
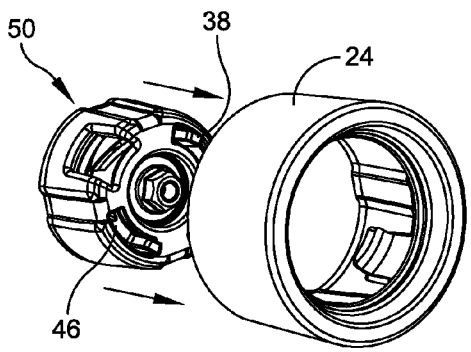
FIG. 5E  FIG. 5F

APPARATUS AND METHODS FOR QUICKLY RELEASING A HUB-AND-WHEEL ASSEMBLY

REFERENCE TO PENDING PRIOR PATENT APPLICATION

This application claims the benefit under 35 U.S.C. 119 (e) of U.S. Provisional Patent Application No. 61/691,580, filed Aug. 21, 2012 by Brian J. Krell for "QUICK RELEASE LOCKING MECHANISM FOR ATTACHMENT AND REMOVAL OF A TIRE TO A HUB," which patent application is hereby incorporated herein by reference.

BACKGROUND

Roller derby is a contact sport played by two teams, each team roller skating in the same direction around a track. Generally, game play consists of a series of short matchups, or "jams," in which both teams designate a scoring player, or "jammer," who scores points by lapping members of the opposing team. Remaining team members attempt to assist their own jammer while hindering the opposing jammer.

Players typically skate on four-wheeled "quad" roller skates. Quality skates can cost up to $1000.00 per pair. A set of eight wheels begins at approximately $30.00 for non-competitive materials and construction and extends to approximately $150.00 for top-end competitive quality.

A player often desires to change one or more wheels during the course of a roller derby game. For example, a single wheel may become worn or damaged from expected wear and tear and require replacement. Alternatively, changing play style or track conditions such as accumulating dirt, debris, and/or moisture may necessitate a full transition of all eight wheels from a first wheel type to a second wheel type more appropriate for the new conditions (e.g., different wheel width, durometer hardness rating, or tread).

Furthermore, initial assumptions about the track may necessitate a wheel change. That is, in the early days of the sport, roller derby games were played on specialized, banked tracks. These tracks were consistent in size, shape, and material and were specially designed for roller derby skates. As time passed, the size of the sport outgrew the number of specialized tracks, and roller derby tracks began to appear on other sporting surfaces such as wooden or rubber basketball courts, running tracks, and more. Due to varying track conditions, players employ different wheels at different tracks. Depending on whether initial assumptions about the track in use are correct (e.g., hardness of the track, friction offered by the track surface), a player may need to change wheels after the start of play to adjust as appropriate.

A traditional wheel changeover for a full set of eight wheels currently takes between twenty and thirty minutes and requires special tooling, e.g., a bearing press. The changeover is also difficult to accomplish with the skates on the player's feet. As a result, wheel changes—whether for one wheel or a whole set of eight—require the player to exit the game, remove one or both skates depending on the number of wheels to be changed, and remain sidelined for a lengthy period of time. Because wheel changes are so inconvenient, players in need of a wheel change often forego the long removal from play, electing to play with a damaged wheel or a set of wheels inappropriate for current playing conditions.

SUMMARY

This Summary is provided to introduce a selection of concepts in a simplified form that are further described below in the Detailed Description. This Summary is not intended to identify key aspects or essential aspects of the claimed subject matter. Moreover, this Summary is not intended for use as an aid in determining the scope of the claimed subject matter.

One embodiment provides a quick release hub-and-wheel assembly for mounting upon a central axle. The device includes an external sleeve, an internal sleeve nested within the external sleeve, and a locking ring rotatably engaged with the internal sleeve and having at least one latch-engagement mechanism and at least one latch-release mechanism. The locking ring and the internal sleeve are configured to bias the latch-engagement mechanism to a latched position. The hub-and-wheel assembly also includes a wheel having at least one latch that is aligned with the latch-engagement mechanism of the locking ring. When the latch is aligned with the latch-engagement mechanism of the locking ring, the application of inward directional pressure along the axle causes the latch to interlock with the latch-engagement mechanism in the latched position.

Another embodiment provides a method for providing a quick release connection between a roller skate wheel and a central axle of a roller skate. The method includes the steps of affixing a quick release hub assembly to the central axle. The hub assembly has a latch-engagement mechanism with top and bottom surfaces, and the latch-engagement mechanism moves between latched and unlatched positions and is biased to the latched position. The method further includes pressing a quick release wheel upon the hub assembly. The wheel has a latch configured to engage the top surface of the latch-engagement mechanism and temporarily displace the latch-engagement mechanism from the latched position to the unlatched position such that the latch pushes beyond the top surface of the latch-engagement mechanism and catches against the bottom surface of the latch-engagement mechanism when the latch-engagement mechanism returns to the latched position.

Yet another embodiment provides a method of manufacturing a quick release hub-and-wheel assembly for use with a central axle. The method includes the steps of forming a locking ring having at least one latch-engagement mechanism and at least one latch-release mechanism, forming an internal sleeve having at least one biasing element configured to bias the latch-engagement mechanism to a latched position when the locking ring is rotatably mounted to the internal sleeve, forming an external sleeve having at least one latch-access aperture, affixing the locking ring and the internal sleeve within the external sleeve such that the latch-engagement mechanism and the latch-access aperture align, and forming a wheel having at least one latch configured to interlock with the latch-engagement mechanism of the locking ring upon the application of directional pressure along the axle.

Yet another embodiment provides a method for attaching a wheel to a central axle. The method includes the step of rotatably coupling a hub to the central axle, the hub having a latch-capture mechanism that is biased to a latched position and a manual release configured to displace the latch-capture mechanism to an unlatched position. The method also includes the step of manually installing a wheel upon the hub, the wheel having a latch configured to temporarily displace the latch-capture mechanism to the unlatched position such that when the latch-capture mechanism returns to the latched position, the latch is retained by the latch-capture mechanism.

Other embodiments are also disclosed, and additional objects, advantages and novel features of the technology will be set forth in part in the following description, and in part will become more apparent to those skilled in the art upon examination of the following, or may be learned from practice of the technology.

BRIEF DESCRIPTION OF THE DRAWINGS

Non-limiting and non-exhaustive embodiments of the present invention, including the preferred embodiment, are described with reference to the following figures, wherein like reference numerals refer to like parts throughout the various views unless otherwise specified. Illustrative embodiments of the invention are illustrated in the drawings, in which:

FIGS. 5A-5F illustrate a process for removing the quick release wheel of FIG. 4 from the hub assembly of FIGS. 3-4.

DETAILED DESCRIPTION

Embodiments are described more fully below in sufficient detail to enable those skilled in the art to practice the system and method. However, embodiments may be implemented in many different forms and should not be construed as being limited to the embodiments set forth herein. The following detailed description is, therefore, not to be taken in a limiting sense.

Figure 1:
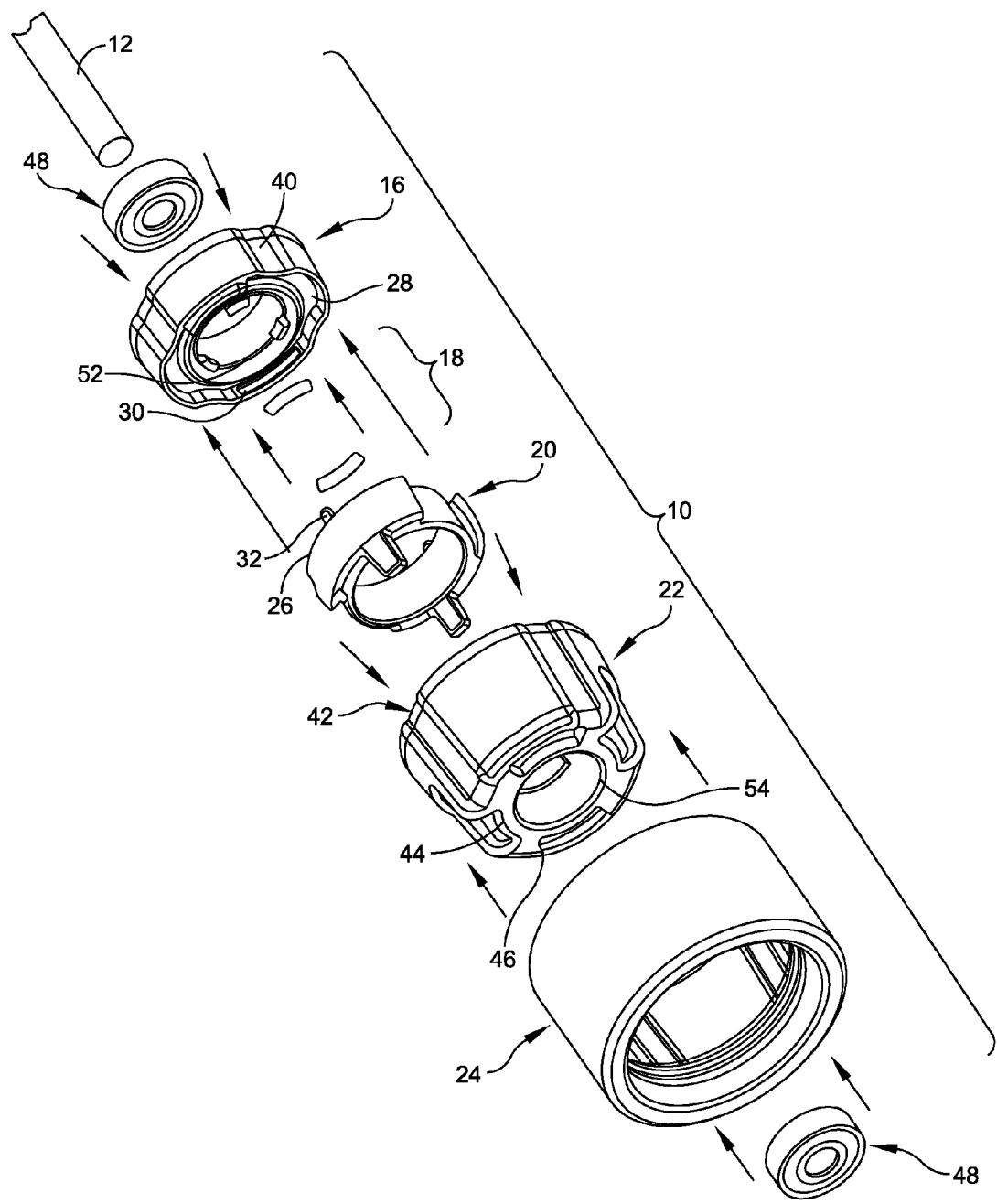
FIG. 1 illustrates an exploded perspective view of a central axle and a quick release hub-and-wheel assembly.

FIGS. 1-4 illustrate various components of an exemplary embodiment of a quick release hub-and-wheel assembly 10. More particularly, FIG. 1 illustrates an exploded perspective view of assembly 10. In this embodiment, assembly 10 may include an internal sleeve 16, a pair of compression springs 18, a locking ring 20, an external sleeve 22, and a wheel 24.

Internal sleeve 16 may be formed in a generally circular shape configured to receive and rotatably retain a notched body 26 of locking ring 20 within a ringed cavity 28. This embodiment of internal sleeve 16 may also include two spring cavities 30 configured to receive and retain compression springs 18. Spring cavities 30 may be configured such that when locking ring 20 is rotatably mounted to internal sleeve 16, compression springs 18 either directly or indirectly engage with a pair of corresponding compression tabs 32 of locking ring 20.

Figure 2:
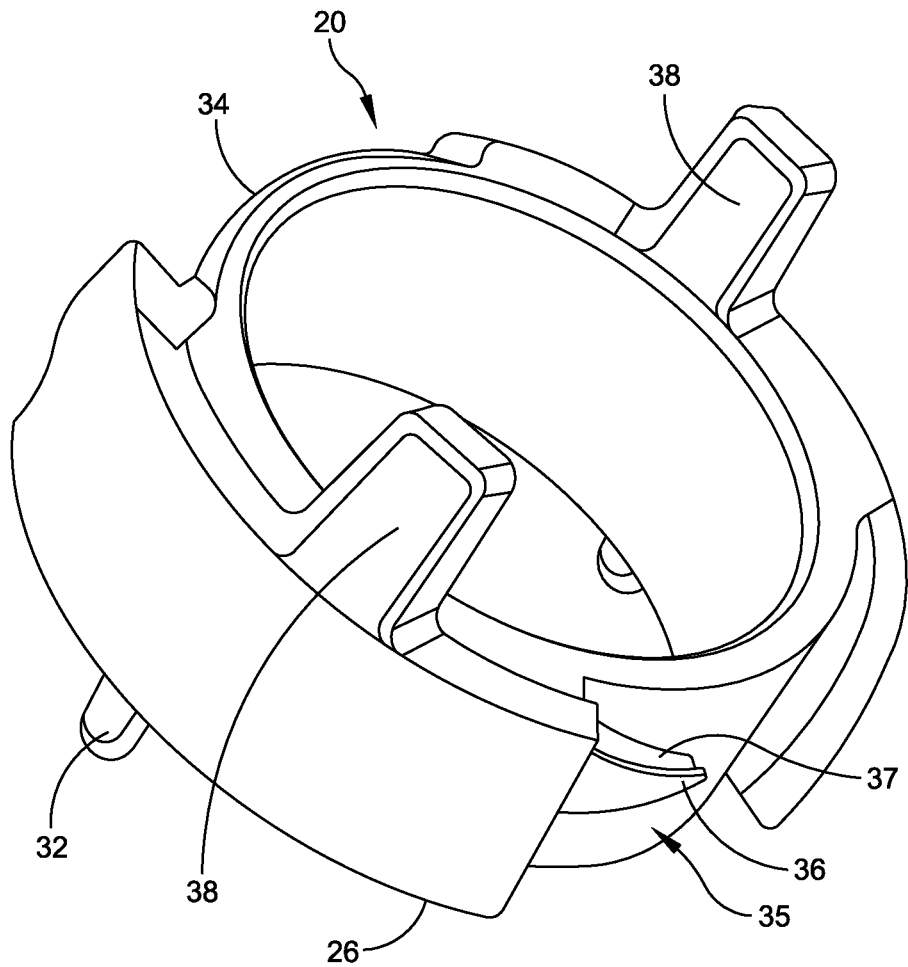
FIG. 2 illustrates a perspective view of a locking ring for use in the hub-and-wheel assembly of FIG. 1.

FIG. 2 illustrates additional details of one embodiment of locking ring 20. In this embodiment, locking ring 20 may include a pair of notches 34. A latch-engagement mechanism, such as an angled protrusion 36, may extend into each notch 34, creating a catch slot 35 directly beneath each notch 34. In this embodiment, locking ring 20 may also include a pair of latch-release mechanisms such as manual toggles 38.

When compression springs 18 are in their relaxed positions, locking ring 20, and thus compression tabs 32 and angled protrusions 36, are biased to a latched position. The functionality of compression springs 18, compression tabs 32, angled protrusions 36, and manual toggles 38 is detailed below in reference to FIG. 4.

Returning to FIG. 1, external sleeve 22 may be configured to press fit over internal sleeve 16 and locking ring 20. To aid with proper alignment and provide a secure fit between internal sleeve 16 and external sleeve 22, internal sleeve 16 may include a number of alignment and stability grooves 40 around its perimeter. Similarly, external sleeve 22 may include a number of alignment and stability ridges 42. When internal sleeve 16 and external sleeve 22 are properly aligned, ridges 42 of external sleeve 22 mate with grooves 40 of internal sleeve 16, thereby providing a secure, stable, and aligned fit.

In this embodiment, a bearing 48 of any appropriate size, shape, type, and/or configuration may be affixed within a bearing cavity 52 of internal sleeve 16 and a bearing cavity 54 of external sleeve 22 to form a complete hub assembly 50 (FIG. 3), capable of rotationally coupling with an axle 12.

Figure 3:
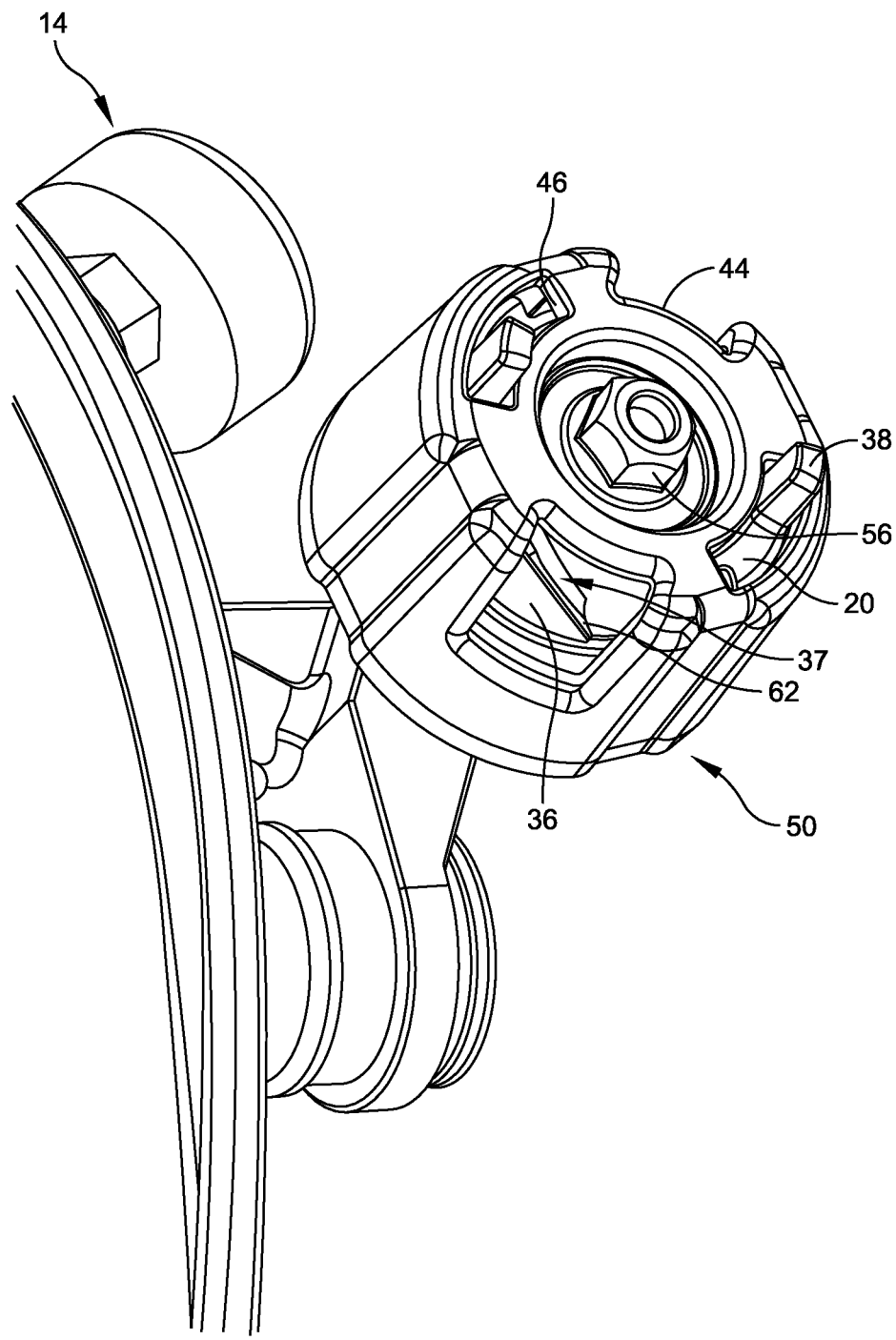
FIG. 3 illustrates a hub assembly as mounted upon a roller skate axle using a standard locking nut.

FIG. 3 illustrates a perspective view of one embodiment of hub assembly 50 as affixed to axle 12 (FIG. 1) of a roller skate 14 using a standard locking nut 56. In this embodiment, external sleeve 22 may include latch-access apertures 44. When internal sleeve 16 and locking ring 20 are nested within external sleeve 22 via the grooves 40 and ridges 42, discussed above in reference to FIG. 1, each latch-access aperture 44 aligns with its corresponding angled protrusion 36 of locking ring 20. In addition, external sleeve 22 may include latch-release apertures 46, through which manual toggles 38 of locking ring 20 may extend for easy manipulation.

While this embodiment of hub assembly 50 is configured to attach to standard axle 12 of roller skate 14, it should be noted that in other embodiments, assembly 50 and hub-and-wheel assembly 10 may be adapted for other axle-based and/or wheeled applications as appropriate. Non-limiting examples include axle-based mechanisms such as wagons, tricycles, skateboards, toy or miniaturized cars and trucks, moving dollies, rolling survey and/or measurement tools, wheeled construction equipment and/or roofing tools, and more.

Figure 4:
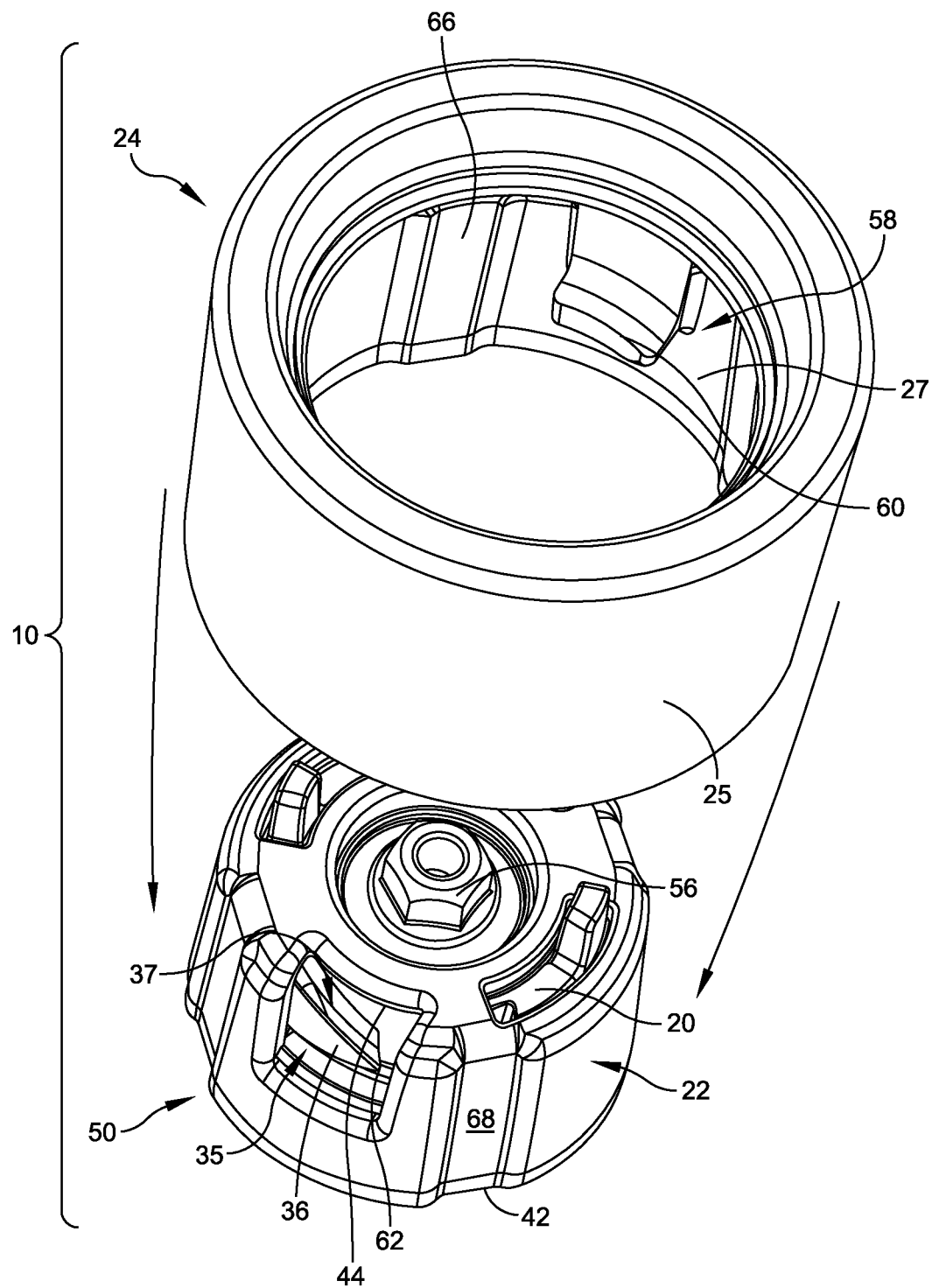
FIG. 4 illustrates an exploded perspective view of the hub assembly of FIG. 3 and a quick release wheel for mounting upon the hub assembly.

FIG. 4 illustrates an exploded perspective view of embodiments of wheel 24 and hub assembly 50. To complete hub-and-wheel assembly 10, wheel 24 may be latched to hub assembly 50 through the application of directional pressure along axle 12 (FIG. 1). More specifically, in one embodiment, wheel 24 includes a tire portion 25 and a hub portion 27. Hub portion 27 of wheel 24 may include a series of mating ridges 66 and two latches 58, each latch 58 having a latch flange 60. Mating ridges 66 may be configured to align with a concave surface 68 of alignment and stability ridges 42 of external sleeve 22, ensuring proper alignment of the locking and release mechanisms. As wheel 24 is pressed onto hub assembly 50, latches 58 pass through latch-access apertures 44 of external sleeve 22 to contact angled protrusions 36 of locking ring 20.

With the continued application of pressure, latch flanges 60 traverse a top surface 37 of angled protrusions 36 in a downward direction. This movement places lateral pressure on angled protrusions 36, thereby causing the associated compression tabs 32 (FIGS. 1-2) to directly or indirectly compress compression springs 18 (FIG. 1) laterally, moving angled protrusions 36 in a clockwise direction from their latched to their unlatched positions.

Once each latch flange 60 clears an apex 62 of the angled protrusion 36, the pressure placed on angled protrusions 36 and corresponding compression tabs 32 (FIGS. 1-2) is automatically removed, allowing compression springs 18 (FIG. 1) to immediately return to their natural, decompressed states. As a result, angled protrusions 36 return to their biased, latched positions, securing latch flanges 60 within catch slots 35, located directly beneath angled protrusions 36.

The pressure required to install wheel 24 upon hub assembly 50 is dependent upon the spring constant of compression springs 18. In this embodiment, compression springs 18 are selected to allow for easy and in-place manual installation of wheel 24 upon hub assembly 50, either by a third-party providing assistance or by the skater him or herself.

Notably, the embodiment of hub-and-wheel assembly 10, described above, includes two latch-engagement mechanisms such as angled protrusions 36, two latch-release mechanisms such as manual toggles 38, and two latches 58. Other embodiments may include additional or fewer latch and release mechanisms as appropriate for the application and depending on a variety of variables such as, for example, the strength of the desired latch, the size of wheel to be secured, the terrain to be traversed, and so on.

FIGS. 5A-5F illustrate the process of removing wheel 24 from hub assembly 50. In this embodiment, a user 64, again either a third-party helper or the skater him or herself, may interact with manual toggles 38 of locking ring 20 (FIGS. 5A-5B) in order to displace them in a clockwise direction within latch-release apertures 46 of external sleeve 22 (5C-5D). Similar to the traversing of wheel latch 58 along angled protrusion 36, discussed above, manually manipulating toggles 38 in this manner causes compression tabs 32 of locking ring 20 to directly or indirectly compress compression springs 18. As a result, angled protrusions 36 of locking ring 20 also move clockwise from their latched to their unlatched positions, freeing latch flanges 60 of latches 58 from their secured positions within catch slots 35 beneath angled protrusions 36. Once latch flanges 60 are free from angled protrusions 36, wheel 24 may be pulled outward and away from hub assembly 50 (FIGS. 5E-5F). Wheel 24 may then be repaired and reinstalled or a different wheel may be mounted upon hub assembly 50.

Currently, a complete changeover of a full set of eight wheels requires special tooling such as a bearing press, is difficult to accomplish while the skates in question are worn in-place, and takes approximately twenty to thirty minutes. As a result, a racing skater must commit to one set of wheels for an entire roller derby game. This impairs the skater's ability to compete because oftentimes track conditions change during play due to damage of the track or the accumulation of dirt, moisture, and/or debris. Employing an embodiment of hub-and-wheel assembly 10, described above, a skater may accomplish a complete wheel changeover, either alone or with the help of a teammate, in approximately thirty seconds and without removing the player's skates. This allows skaters to consistently skate on wheels that are appropriate for current track conditions, maximizing their competitive advantage.

Figure 6:
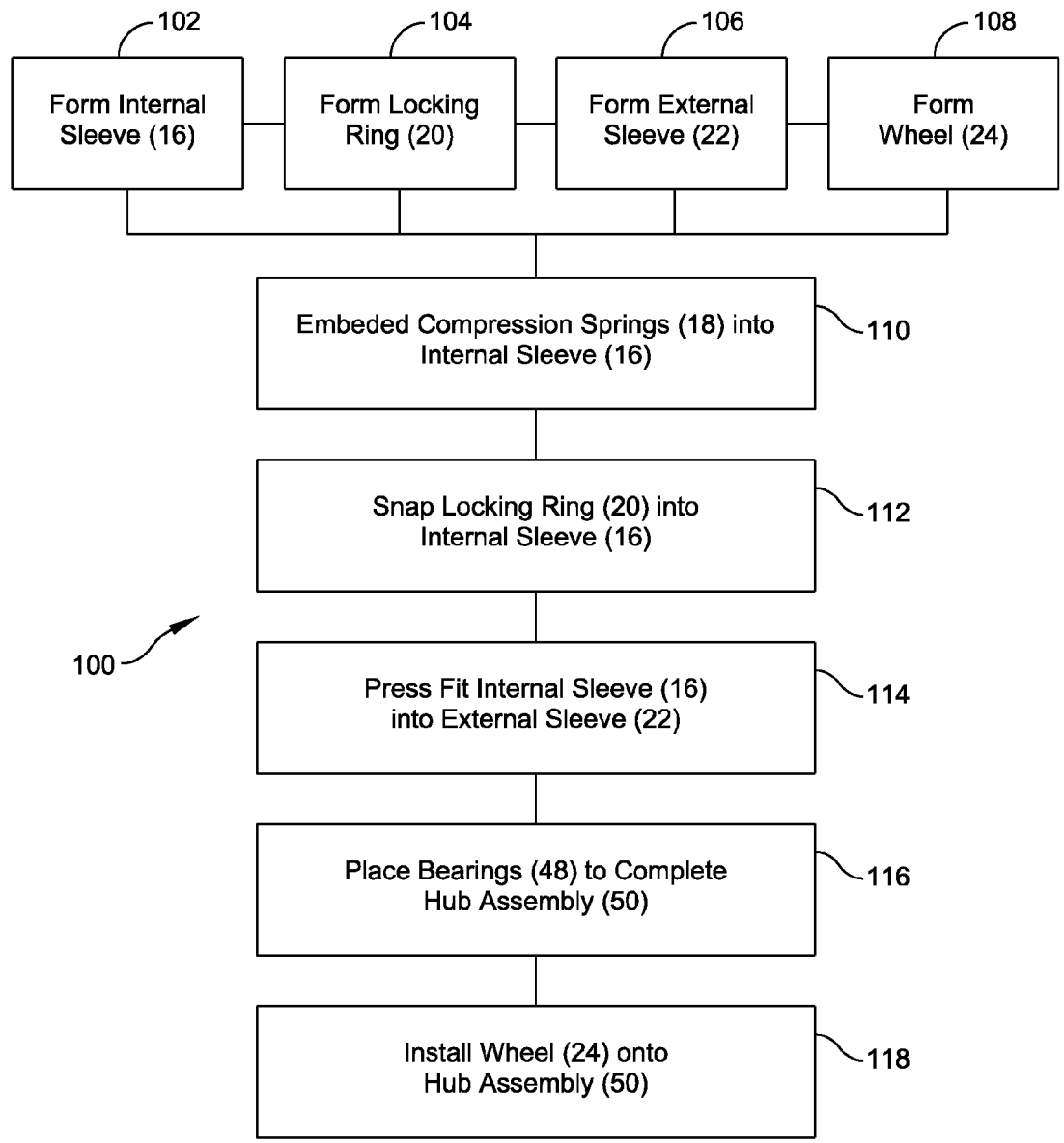
FIG. 6 illustrates a flow chart detailing the steps of a method for manufacturing the hub-and-wheel assembly of FIG. 1.

FIG. 6 illustrates a flow chart of a method 100 for manufacturing an embodiment of hub-and-wheel assembly 10, discussed above. Method 100 includes forming internal sleeve 16 (102), forming locking ring 20 (104), and forming external sleeve 22 (106). These parts may be formed of any appropriate material using any appropriate manufacturing method. For instance, they may be formed of injection molded plastic or machined metal. Method 100 also includes forming wheel 24 (108). Tire portion 25 of wheel 24 may be formed of urethane and purchased as a standard part. Tire portion 25 may feature varying durometer hardness ratings depending on the resistance to outside penetration required. Generally, durometer ratings for roller derby applications fall between 88 A and 98 A. Hub portion 27 of wheel 24 may be formed of machined nylon, aluminum, or any other appropriate material.

While the formation of internal sleeve 16, locking ring 20, external sleeve 22, and wheel 24 is discussed above in a specific order, these parts may be formed and/or purchased in any appropriate order preferred by the manufacturer.

Next, compression springs 18 may be inserted, embedded, nested, or otherwise placed within spring cavities 30 of internal sleeve 16 (110). Once springs 18 are in place, locking ring 20 may be snapped into ringed cavity 28 of internal sleeve 16 such that manual toggles 38 of locking ring 20 extend outward (112). Then the combined internal sleeve 16 and locking ring 20 may be press fit or otherwise secured within external sleeve 22 (114), using alignment and stability grooves 40 of internal sleeve 16 and alignment and stability ridges 42 of external sleeve 22 as guides.

Bearings 48 may be inserted into bearing aperture 52 of internal sleeve 16 and bearing aperture 54 of external sleeve 22 at any appropriate juncture (116) to form hub assembly 50. That is, bearings 48 may be inserted (116) before or after the assembly of locking ring 20 and internal sleeve 16 or before or after the assembly of locking ring 20 and internal sleeve 16 into external sleeve 22.

To complete hub-and-wheel assembly 10, wheel 24 may be manually pressed and latched onto hub assembly 50 (118) in the manner discussed above with respect to FIG. 4.

At any time after hub assembly 50 is complete, it may be attached to axle 12 using standard locking nut 56. This step is not part of manufacturing method 100, as it is not a necessary step in manufacturing hub-and-wheel assembly 10 itself, but such attachment may be completed by the manufacturer, retailer, user, or another party before hub-and-wheel assembly is put to use in connection with an axle-based device.

Again, while the steps of method 100 have been described in a particular order, the steps may be completed in any logical and/or reasonable order that results in a complete hub-and-wheel assembly 10.

Although the above embodiments have been described in language that is specific to certain structures, elements, compositions, and methodological steps, it is to be understood that the technology defined in the appended claims is not necessarily limited to the specific structures, elements, compositions and/or steps described. Rather, the specific aspects and steps are described as forms of implementing the claimed technology. Since many embodiments of the technology can be practiced without departing from the spirit and scope of the invention, the invention resides in the claims hereinafter appended.

What is claimed is:

1. A quick release hub-and-wheel assembly for mounting upon a central axle, comprising:
   an external sleeve having at least one latch-access aperture;
   an internal sleeve having at least one biasing element;
   a locking ring having at least one latch-engagement mechanism and at least one latch-release mechanism, said locking ring configured to rotatably mount to said internal sleeve, the at least one biasing element configured to bias said latch-engagement mechanism to a latched position when said locking ring is rotatably mounted to said internal sleeve, and said locking ring and said internal sleeve configured to affix to one another within said external sleeve such that said latch-engagement mechanism and said latch-access aperture align; and
   a wheel having at least one latch configured to interlock with said latch-engagement mechanism in said latched position of said locking ring upon an application of inward directional pressure along the axle.

2. The quick release hub-and-wheel assembly of claim 1, wherein said latch-engagement mechanism and said latch-release mechanism of said locking ring are configured to displace said at least one biasing element from said latched position to an unlatched position.

3. The quick release hub-and-wheel assembly of claim 2, wherein said latch-engagement mechanism of said locking ring comprises an angled protrusion configured to extend through the latch-access aperture in said external sleeve to interlock with said at least one latch of said wheel.

4. The quick release hub-and-wheel assembly of claim 2, wherein said latch-engagement mechanism comprises an angled protrusion on said locking ring and said latch-release mechanism comprises a toggle configured for manual manipulation.

5. The quick release hub-and-wheel assembly of claim 2, wherein said biasing element comprises a compression spring.

6. The quick release hub-and-wheel assembly of claim 1, wherein said locking ring comprises two latch-engagement mechanisms and two latch-release mechanisms.

7. A method for providing a quick release connection between a roller skate wheel and a central axle of a roller skate, the method comprising the steps of:
affixing a quick release hub assembly to the central axle, said hub assembly having a latch-engagement mechanism wherein said latch-engagement mechanism moves between a latched position and an unlatched position;
providing an internal sleeve having at least one biasing element configured to bias said latch-engagement mechanism to said latched position;
rotatably mounting said hub assembly to said internal sleeve;
providing an external sleeve having at least one latch-access aperture;
affixing said hub assembly and said internal sleeve within said external sleeve such that said latch-engagement mechanism and said latch-access aperture align;
pressing a quick release wheel upon said hub assembly, said wheel having a latch configured to interlock with said latch-engagement mechanism upon an application of directional pressure along the axle.

8. The method of claim 7, further comprising the steps of:
manually shifting a latch-release mechanism of said hub assembly to said unlatched position, said latch-release mechanism configured to displace the at least one biasing element that is mechanically linked to said latch-engagement mechanism, thereby moving said latch-engagement mechanism from said latched position to said unlatched position and releasing said latch of said wheel; and
pulling said wheel from said hub assembly.

9. The method of claim 8, wherein said latch-engagement mechanism comprises an angled protrusion that is mechanically linked to said biasing element.

10. The method of claim 9, wherein said latch-release mechanism comprises a manual toggle that is mechanically linked to said biasing element.

11. The method of claim 10, wherein said biasing element comprises a compression spring.

12. The method of claim 7, wherein said hub assembly comprises two latch-engagement mechanisms.

13. A method of manufacturing a quick release hub-and-wheel assembly for use with a central axle, the method comprising the steps of:
forming a locking ring having at least one latch-engagement mechanism and at least one latch-release mechanism;
forming an internal sleeve having at least one biasing element configured to bias said latch-engagement mechanism to a latched position when said locking ring is rotatably mounted to said internal sleeve;
rotatably mounting said locking ring to said internal sleeve;
forming an external sleeve having at least one latch-access aperture;
affixing said locking ring and said internal sleeve within said external sleeve such that said latch-engagement mechanism and said latch-access aperture align; and
forming a wheel having at least one latch configured to interlock with said latch-engagement mechanism of said locking ring upon an application of directional pressure along the axle.

14. The method of claim 13, wherein each of said latch-engagement mechanism and said latch-release mechanism are mechanically linked to a first end of said biasing element.

15. The method of claim 14, wherein said latch-engagement mechanism comprises an angled protrusion on said locking ring and said latch-release mechanism comprises a manual toggle on said locking ring.

16. The method of claim 15, wherein said hub-and-wheel assembly is configured for use with the central axle of a roller skate.

17. The method of claim 13, further comprising the step of rotationally coupling one or more bearings to said internal sleeve for rotationally coupling to the central axle.

18. A method for attaching a wheel to a central axle, the method comprising the steps of:
providing a locking ring having at least one latch-engagement mechanism and at least one latch-release mechanism;
providing an internal sleeve having at least one biasing element configured to bias said latch-engagement mechanism to a latched position when said locking ring is rotatably mounted to said internal sleeve;
rotatably mounting said locking ring to said internal sleeve;
providing an external sleeve having at least one latch-access aperture;
affixing said locking ring and said internal sleeve within said external sleeve such that said latch-engagement mechanism and said latch-access aperture align;
providing a wheel having at least one latch configured to interlock with said latch-engagement mechanism of said locking ring upon an application of directional pressure along the axle;
rotatably coupling a hub to the central axle, said hub having the latch-engagement mechanism; and
manually installing said wheel upon said hub, said wheel having the at least one latch configured to interlock with said latch-engagement mechanism upon the application of directional pressure along the axle.

19. The method of claim 18, wherein the central axle is a roller-skate axle.

* * * * *